United States Patent
Meany et al.

(10) Patent No.: US 10,977,481 B2
(45) Date of Patent: Apr. 13, 2021

(54) SYSTEM AND METHOD FOR OBJECT MATCHING USING 3D IMAGING

(71) Applicant: Skusub LLC, Las Vegas, NV (US)

(72) Inventors: Keith H. Meany, Charleston, SC (US); Matthew Antone, Winchester, MA (US)

(73) Assignee: Skusub LLC, Las Vegas, NV (US)

( * ) Notice: Subject to any disclaimer, the term of this patent is extended or adjusted under 35 U.S.C. 154(b) by 98 days.

(21) Appl. No.: 16/563,565

(22) Filed: Sep. 6, 2019

(65) Prior Publication Data

US 2020/0005020 A1    Jan. 2, 2020

Related U.S. Application Data

(63) Continuation-in-part of application No. 15/350,003, filed on Nov. 11, 2016, now Pat. No. 10,410,043.

(60) Provisional application No. 62/354,603, filed on Jun. 24, 2016.

(51) Int. Cl.
| | |
|---|---|
| *G06K 9/00* | (2006.01) |
| *G06T 17/00* | (2006.01) |
| *G06F 16/28* | (2019.01) |
| *G06N 3/02* | (2006.01) |

(52) U.S. Cl.
CPC ....... *G06K 9/00201* (2013.01); *G06F 16/284* (2019.01); *G06N 3/02* (2013.01); *G06T 17/00* (2013.01)

(58) Field of Classification Search
CPC .... G06K 9/00201; G06F 16/284; G06N 3/02; G06T 17/00
See application file for complete search history.

(56) References Cited

U.S. PATENT DOCUMENTS

| | | | | |
|---|---|---|---|---|
| 9,424,461 | B1* | 8/2016 | Yuan | G06K 9/00214 |
| 9,977,995 | B2* | 5/2018 | Huang | G06K 9/52 |
| 2004/0086203 | A1* | 5/2004 | Furuhashi | G06K 9/6217 |
| | | | | 382/305 |
| 2005/0157931 | A1 | 7/2005 | Delashmit, Jr. | |
| 2008/0082426 | A1* | 4/2008 | Gokturk | G06K 9/62 |
| | | | | 705/26.62 |
| 2013/0132402 | A1* | 5/2013 | Yang | G06F 16/5838 |
| | | | | 707/748 |
| 2016/0012594 | A1* | 1/2016 | Romanik | G06T 7/337 |
| | | | | 382/203 |
| 2016/0078057 | A1* | 3/2016 | Perez de la Coba | |
| | | | | G06K 9/6212 |
| | | | | 707/772 |
| 2016/0155011 | A1* | 6/2016 | Sulc | G06K 9/00671 |
| | | | | 382/103 |

(Continued)

*Primary Examiner* — David F Dunphy
(74) *Attorney, Agent, or Firm* — Kajane McManus; Jeanette M. Braun; Braun IP Law, LLC (57) ABSTRACT

The system and method utilize three-dimensional (3D) scanning technology to create a database of profiles for good, product, object, or part information by producing object representations that permit rapid, highly-accurate object identification, matching, and obtaining information about the object, which is not afforded by traditional two-dimensional (2D) camera imaging. The profiles can compared to a profile of an unknown object to identify, match, or obtain information about the unknown object, and the profiles can be filtered to identify or match the profiles of known objects to identify and/or gather information about an unknown object.

20 Claims, 7 Drawing Sheets

(56) References Cited

U.S. PATENT DOCUMENTS

2016/0224858 A1* 8/2016 Chen .................... G06K 9/4661
2017/0060904 A1* 3/2017 Pau ..................... G06F 16/5854

* cited by examiner

SYSTEM AND METHOD FOR OBJECT MATCHING USING 3D IMAGING

CROSS REFERENCE TO RELATED APPLICATIONS

This application is a continuation-in-part of U.S. Ser. No. 15/350,003 filed Nov. 11, 2016, currently pending and titled SYSTEM AND METHOD FOR PART IDENTIFICATION USING 3D IMAGING, which claims priority from U.S. Provisional Patent Application No. 62/354,603 filed on Jun. 24, 2016, of the same title, the content of each is incorporated herein in its entirety by reference, as if fully restated herein.

BACKGROUND OF THE INVENTION

Field of the Invention

The present invention deals with three-dimensional (3D) scanning technology which produces object representations which permit rapid, highly-accurate object identification and matching of the object to an object in a database which is not afforded by traditional two-dimensional (2D) camera imaging.

Prior Art

Selling of objects, products, or goods, such as, but not limited to, clothing, housewares, groceries, and replacement parts is a huge business, and an automated approach to identification and matching of the goods to information stored in a database is long overdue. Almost every industry today shares the common problem of maintaining repair or replacement goods, objects or parts for rapidly expanding product lines. Products are constantly changing; for instance, becoming more energy efficient, more current in fashion trends, or more technologically advanced. Over time, the ability to identify and repair specific goods, products, or product lines has become increasingly difficult. For instance, for replacement parts, each new line of products, say hardware, for instance, adds a multitude of replacement parts to a seemingly endless list that continues to accumulate for decades. The sheer volume of information is often overwhelming for all but the most expert individuals in a particular field. Only such experts possess the knowledge and experience necessary to identify these parts, and obtaining that knowledge requires years or decades of exposure to the lines. Goods, products, or parts identification has thus largely become a lost art, which has led large retailers to only attempt identification, and achieve finding a replacement or matching part for only the most common and readily available items.

A prime example of these trends is found in the plumbing parts industry. An active plumbing parts market began in the 1920s as residential plumbing became commonplace. Originally plumbing manufacturing was a localized industry, but over time some brands grew to be regional and national, dramatically increasing the number of fixtures in the field and, in turn, the difficulty of parts identification. As product lines have evolved, many manufacturers have failed to keep track of their own parts for discontinued lines. Furthermore, in the past two decades, imported products sold through home centers have flooded the market; these fixtures have virtually no manufacturer support in terms of parts identification nor inventory. Finally, because the plumbing industry has become a fashion industry, entire product lines can change at the whim of fashion trends, compounding the difficulty of parts identification further. Some manufacturers still maintain some of their obsolete parts, and non-OEM manufacturers have replaced many thousands of discontinued items. As a result, today there are decades of parts available, but average consumers and distributors have no way of identifying these parts quickly and accurately. In the present exemplary method, a massive cross-referenced database of thousands of plumbing repair parts has been created, but even this database is so massive that only an expert can sift through it efficiently.

A number of recognition methods have been developed that rely solely on images both for off-line database models and for online recognition with a few significant differences from that proposed herein. Firstly, the presently available systems capture only a two-dimensional (2D) projection of an object, with no depth information. The third dimension must be inferred indirectly, for instance by using a very large number of photographs at different angles to train each object type, or is not used at all, severely limiting performance. In addition to lacking depth, 2D projections also carry no notion of absolute scale, meaning that it is impossible to determine the true physical dimensions of an object solely from images in meaningful real-world units such as inches or millimeters. There is an inherent ambiguity that couples the actual object size with its distance from the camera; i.e., a part that is twice as large imaged from twice as far away will look the same in a photograph, and thus cannot be distinguished.

Secondly, the appearance of objects in photographs is subject to many external and uncontrolled factors that can dramatically alter measurements from one image to another, and thus makes recognition even more challenging. Environmental lighting causes reflections and glare, casts shadows, and changes the apparent color and lightness of object surfaces. Radiometric characteristics of the imager itself, including color response curves of the photodetector, white balance and gain adjustments, aperture and shutter settings, focus, etc., also affect object appearance, sharpness, and color. The perspective and distance from which an object is viewed, along with geometric lens properties of a camera used in taking the photographs, can distort the object's visible shape, vary its appearance, and cause self-occlusions that differ from image to image.

Two 2D parts recognition solutions currently available are provided by:

The exemplary 3D part recognition system of the present invention allows for quicker, and far more accurate product identification than afforded by 2D scanning, with minimal user training.

With respect to data acquisition, non-contact 3D scanners fall into two broad categories: passive sensing, such as binocular stereoscopic vision or monocular structure-from-motion, which uses only cameras; and active sensing, projecting light onto scanned objects and measuring the response with a camera to infer depth. Active scanners can be further partitioned into two subcategories:

1. Time of flight. Pulses of light are generated by an emitter, and a photodetector or camera measures the phase shift and thus the time taken for the pulse to travel to the object and return. This time is directly proportional to the distance from the emitter to the scanned surface, allowing range values to be easily computed. Line scan ranging devices use a single laser beam combined with a spinning mirror, and thus only measure a single bearing range pair at each sample, while area-pulsed devices use a broader wave front and thus can measure range over an entire photodetector array at once.

2. Structured light. A projector, typically a laser diode or digital light processing (DLP) device, emits a known pattern of light, such as a stripe, dot array, or fringe pattern, that illuminates the scanned object's surface. A precisely calibrated camera records the reflection of this pattern, and the degree of measured geometric deformation of the pattern allows calculation of the surface's shape.

Raw output formats of individual scans include bearing range sequences, depth images, and point clouds. Most scanning systems also allow placing the scanned object on a turntable, or physically moving the sensor around the object, to collect multiple scans so that all surfaces are visible. Software can then automatically "stitch" the different views together into a single coherent model, which can be exported to a variety of standard formats, including regularly sampled 3D point clouds or watertight meshes consisting of vertices and triangles. Red-green-blue (RGB) color values from the scanner's imager can also be assigned to each point or mesh vertex to form texture maps that encode the visible appearance of the object's surfaces. Under controlled conditions, high quality scanners produce very detailed 360 degree object models with sub-millimeter resolution, precisely capturing even very fine scale features such as screw threading and surface embossing. Furthermore, models can be acquired very quickly, especially by area pattern structured light scanners that image large portions of the object's surface simultaneously. These qualities make 3D imaging and/or scanning viable for large scale parts database acquisition and for discriminating between multiple parts with subtle shape differences.

With respect to part identification via 3D scans, a number of methods have been developed in the scientific literature for recognizing objects based on their 3D shape. A prototypical object recognition system operates in two phases:

A.1. Training. This is an offline process and is only required when new object models (or part SKUs) are added. The recognition system is fed a series of well-curated, labeled scans of the objects to be recognized, and constructs or "learns" a database that associates each object label with a summary representation or model of that object, typically consisting of features such as spatial dimensions, 3D point clouds, or geometric descriptors. The training process can also comprise building feature indexes and/or learning classifiers, such as partitions of the feature space or weights in a neural network, over all models for more efficient recognition.

A.2. Query. This is an online process that is invoked whenever an unknown object or part is to be recognized. The system converts a 3D scan of the "query" object into a summary representation commensurate with that stored in the training database. The method then proceeds to determine a score, probability, or other degree of similarity between the query object and each of the learned models in the database; similarity can be determined using any of a number of approaches, such as exhaustive comparison, indexing/hashing, bag-of-words retrieval, application of a classifier, or propagation through a neural network. The system then reports an ordered list of the top matching labels and their associated scores.

B. Two key factors in recognition system performance are object representation (i.e. features) and matching criteria (i.e. method by which features are compared). There are several broad choices for recognition strategies, including:

B.1. Hierarchical. A cascaded series of rapidly-computed attributes that partition the database into a tree-like structure. Within each subsequent level of the tree is a finer degree of specificity. This permits very efficient query even with a very large number of models.

B.2. Holistic. The entire object, for instance in the form of a point cloud or summary descriptor feature, is matched against the database, for instance exhaustively, via indexing, or via a learned classifier. This method works best for rigid, non-articulated object types. While exhaustive matching is highly accurate, it can be somewhat slow, and some types of matching may depend on precise object-to-object alignment.

B.3. Feature-based. A set of local geometric descriptors is computed for each object model and for the query object in the form of multidimensional feature vectors, optionally with associated 3D spatial locations. The feature vectors extracted from the query object are compared to those extracted from the database models, optionally with geometric consistency criteria applied across the set of feature matches. This method can be very fast with proper indexing and exhibits robustness to missing information, clutter, and misalignment.

Aspects of these strategies may also be combined in various ways to achieve desired levels of accuracy and speed. Matching methods work best when (1) objects to be recognized have predictable shape, (2) scans are of high quality and detail, (3) objects are scanned in isolation from other objects and background clutter, and (4) objects are in approximately known orientation when scanned. Under benign and controlled conditions, recognition rates can exceed 99% accuracy with very few false positives, even for large model databases. The degree of geometric similarity between models in the database is also an important factor in how reliably objects can be distinguished from one another, and the number of different models determines the speed with which results can be generated.

It will be understood that many industries, such as plumbing, automotive, fastener, marine, window and door, etc., have continually growing product lines, and as new models flood the market, the inventory of repair and replacement parts continues to grow as well. Personnel with the expertise required to identify parts across an entire discipline are increasingly rare, since acquiring this knowledge requires decades of experience. As a result, large retail stores like Lowes, Home Depot, Ace Hardware, etc. teach their personnel "Priority Parts Identification" only; these are items that are most frequently requested at the store.

SUMMARY OF THE INVENTION

The object identification, recognition, and/or matching approach of the present invention relating to part identification involves four main components.

A. DATABASE: A comprehensive catalog consisting of 3D object scans is created a-priori for training and analyzed by the system to produce digital feature models, indexes, and/or classifiers. These models form the reference database used by the system to recognize query objects. A computer can be used to access the database.

B. USER-BASED SCANNING: End users scan an object comprising unknown information, say, for instance, price or a replacement part or parts for the object with any electronic instrument—such as their own mobile device capable of 3D imaging, stereo cameras (using two ordinary cameras to create 3d scans), a structured light or time-of-flight 3D scanner, depth camera, or a dedicated 3D scanner installed at a retail location—to form queries. A query scan is then analyzed by the system to produce a digital profile compatible with the database.

C. MATCHING SYSTEM: A computerized computation system compares features in the query profile with features in the database via hierarchical, holistic, and/or feature-based methods. Candidate matches are ranked according to a score value.

D. DATA PRESENTATION: Ranked match results, along with part numbers, inventory quantity, images, and other descriptive information, can be displayed to the user (e.g., for online order fulfillment). Results can also be routed to various other back end services for further processing, analytics, or visual search.

In the Plumbing section, for instance, Priority Parts are typically stems and cartridges. Most retail stores maintain inventory and are able to readily identify approximately 100 stems and cartridges at any given time, but more than 2,000 different types actually exist. It has proven nearly impossible for stores and wholesalers to maintain personnel with the requisite expertise to identify these additional 1,900 items, so most locations do not carry inventory other than the Priority Parts. As a result, the consumer is often left unsatisfied, or even forced to buy an entirely new fixture, which is both expensive and wasteful. Further, there are certain objects, products, or goods, that lose their tags while being displayed for sale. As one example, certain hardware is stored in bins that, when riffled through, can cause the hardware to lose its tag and not be able to be scanned at a register. As another example, a produce item at a grocery store may suffer the same fate. The good, product, or object, which was once a known product, good, or object with identifying information attached to it, has become an unknown product, good, or object, and if it cannot be restored to being a known object, product, or good, becomes waste and is typically thrown away.

The present recognition system will solve these problems by allowing store employees and/or consumers to quickly and automatically identify unknown goods, products, objects, or parts with no prior product-specific experience. The system will accommodate a variety of user-based scanning methods, including 3D scanners placed in retail stores, consumer-grade depth cameras emerging on mobile phones, etc. The scan of the unknown goods, product, object, or part, can be compared to at least one database of profiles, though the computer system may contain multiple databases, for known goods, products, objects, or parts. The database(s) will be comprehensive, containing both common and rare items, so that identification, matching, and fulfillment do not depend on particular inventory or experience level of an employee that happens to be on hand. Users will simply place a good, product, object, or part of interest in front of the scanner, and the system will efficiently provide a ranked list of the most likely good, product, part, or object matches. The good, product, object, or part of interest does not have to be a complete or full good, product, object, or part of interest. It can be a partial good, product, object, or part of interest, and the system will efficiently provide a ranked list of most likely good, product, part, or object matches, even if only a partial 3D scan of the product, good, object, or part is available.

With respect to advantages of the system and method of the present invention, 3D scanners overcome nearly all of the shortcomings of existing image-based solutions by measuring an object's surfaces directly. They recover object shape and true size in all three dimensions simultaneously, with no ambiguities arising from distance, viewpoint, lighting, or occlusion. Because 3D scanners measure true, objective properties (physical distance) rather than apparent, subjective properties (projection and reflectance), they produce inherently more reliable observations that can be meaningfully compared for much more accurate object recognition. Furthermore, building large databases is a more straightforward process, requiring fewer observations of each object type, and models can even be obtained through other means such as CAD drawings.

The use of 3D scanners thus affords the system significant advantages in terms of accuracy and efficiency, which allow for the building of the goods, objects, parts, or products databases much more quickly, and allow goods, objects, parts, or products to be recognized much more easily and effectively, than existing solutions, even when only a portion of the good, object, part, or product is available for scanning, or only a partial scan thereof is available.

DESCRIPTION OF THE PREFERRED EMBODIMENT

Figure 1:
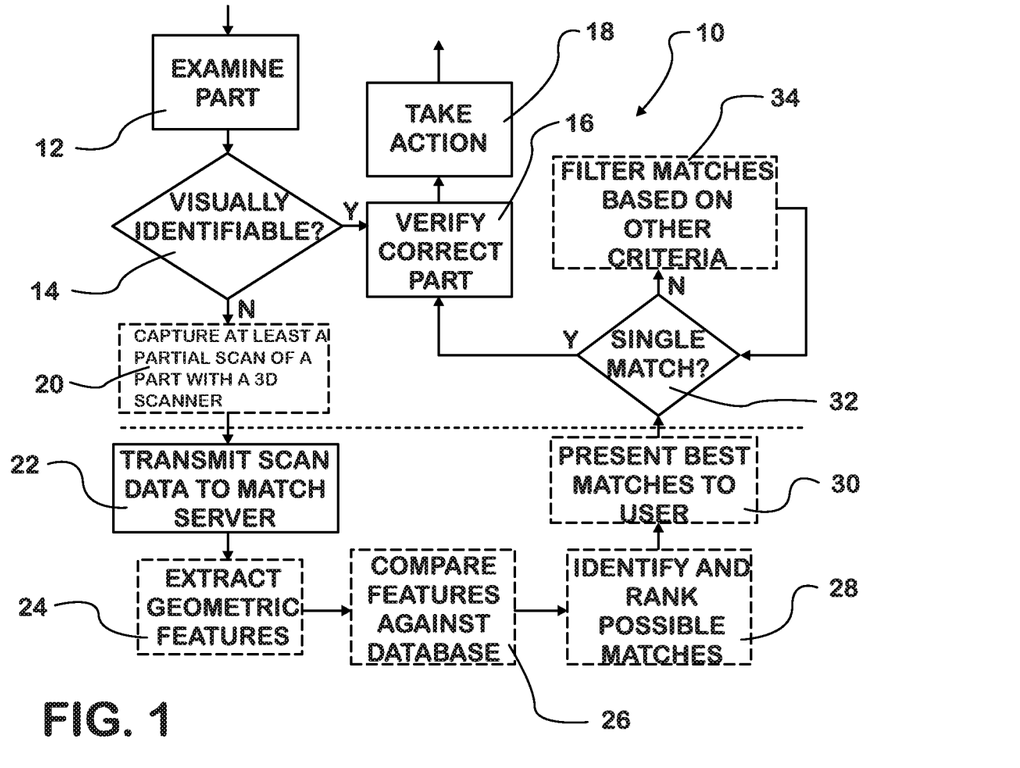
FIG. 1 presents a system level logic flow diagram used by the computerized system and method of the present invention.

Turning to FIG. 1, there is illustrated therein a low level system level logic flow 10 diagram wherein a user has a physical good, product, object, or part that he/she wishes to identify, e.g., for the purpose of repair, replacement, matching it to a known part, product, object, or good, finding out the price of the part, or re-ordering. Use of the word "part" in this disclosure also means object, product, or good, and vice versa. Some parts may be easily identified by visual inspection 12 from information imprinted on the surface, prior experience, distinctive shape, size, etc. If such is present, and the part is visually identifiable 14, then one merely verifies that the part is correct in step 16, and takes action, ordering the proper part at 18. However, many are not readily identifiable, perhaps due to uncommon brand, outdated product, damaged/dirty condition, missing information tag, or unfamiliarity. In such a case, the user captures the part parameters with a 3D imaging device at 20. The part parameters do not have to be complete. A partial part can be submitted for scanning, or a partial scan of the part can be utilized. The resulting scan data is transmitted at 22 to a computerized recognition system that resides either locally or on a remote network.

The data is then processed to extract a profile consisting of geometric and photometric descriptors 24 suitable for part identification. The computerized recognition system compares this profile against a corresponding database 26 of previously acquired profiles, eliminates very unlikely matches 28, and ranks surviving candidate profiles according to match likelihood. The associated identifiers (e.g., part numbers) for the best matches, along with their likelihoods, are returned and presented to the user via graphical display 30.

If the logic flow 10 returns a single match at 32, the part is verified at step 16 and ordered at step 18. If the logic flow 10 returns more than one match at 32, then the user can interactively filter the results at 34 via the display based on manually-entered attributes and based on visual comparison of the physical part with images, 3d models, and textual descriptions of the candidates. Finally, when the candidate list has been narrowed to a single matching part at 32, the user verifies the correct part at 16 and can act on the resulting identifier, for example, order a replacement directly from the catalog website at 18.

Figure 2:
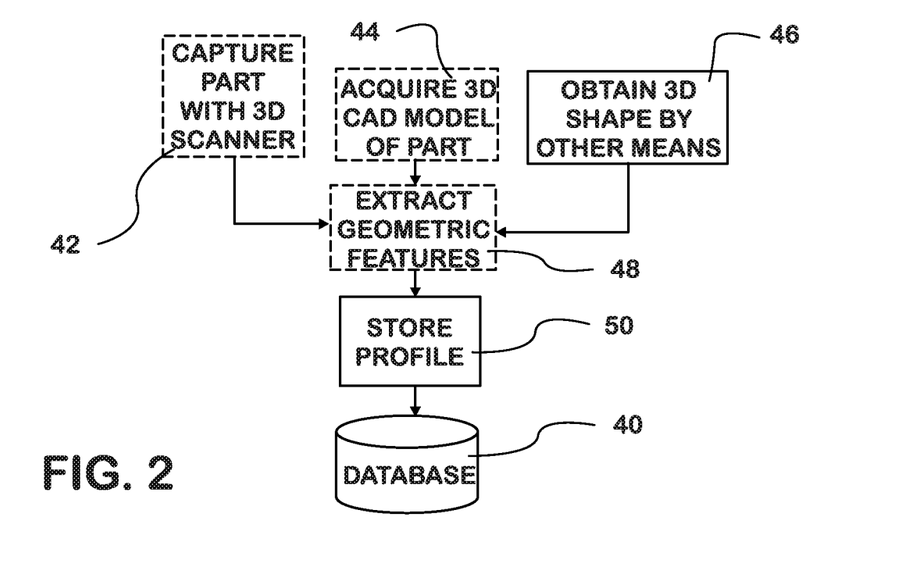
FIG. 2 presents a logic flow diagram for creation of a database of particular objects or parts.

Turning now to FIG. 2, the database 40 of the computerized system 10 used to recognize the particular object or part is created offline, and contains a set of part identifiers, such as, for example, for a plumbing valve and may be captured by any suitable means such as those at steps 42, 44 or 46. Associated with each identifier is created a geometric and photometric profile 48 compatible with that extracted from the scanned part, as well as other information such as photographs, textual descriptions, and human-readable attributes that can be used for manual filtering by the user. The database may be populated by scanning physical objects, or by other means such as acquiring CAD models from manufacturers. Profiles are then stored at 50 to the database 40 and are derived from the initial 3d representation in the same manner as from the user-scanned part. Indexes, clustering, classifiers, neural networks, and other data aggregation and organization can also be created and stored to the database 40. Definitions of terms used herein are listed below for ease of comprehension:

part: is also referred to herein as an object, good, or product and is a specific physical object with a mostly rigid 3d shape; for instance, a hardware item such as a fastener, faucet stem, mounting bracket, etc., or a grocery item, a product stored inside flexible packaging, fashion item, jewelry item, electronic item, or any other item that movable.

user: the operator of the system; for instance, a retail store employee wishing to identify a part, or a consumer wishing to find a replacement.

scanner: a device that can create a digital 3d model of a presented object by measuring distance and/or appearance, e.g., using cameras, projectors, and/or lasers.

features: attributes of an object such as local and global 3d shape, physical dimensions, and visual appearance represented as a series of numeric values, which can be obtained by using a 2d camera, 3d scanner, or prior knowledge base.

profile: a digital representation of an object that encodes one or more features.

identifier: a unique name or tag uniquely identifying a particular object or part, such as a product number or SKU.

database: a digital catalog or repository of parts, along with their identifiers and profiles, that can be queried according to various attributes, and can be concatenated, augmented, or updated with data from previous queries.

match: a correspondence between the user-scanned part and a candidate part from the database.

likelihood: a score or probability that a particular match is correct, or a degree of similarity between the query and the match.

recognition: the search for and retrieval of the most likely matches for a particular object or part from a database, as well as the likelihood of each match.

query: a particular object or part instance that the user wishes the system to recognize.

classifier: a construct, derived via machine learning or otherwise, that assists in or performs recognition by mapping profiles to object categories or identifiers.

The system distinguishes itself from competition and prior art in a number of ways, some of which are denoted at present in FIGS. 1 and 2. Foremost among these is the use of 3D information at all stages, including database creation, part query, part matching, and user interaction. While other methods may share similar overall logic structure, they rely solely on digital images instead, which are inherently 2D projections of an object's true 3D shape.

Particular items of note:

(1) A digital 3D representation of the query part is acquired (e.g., via turntable scanner or mobile device) and used for matching by the system against the database information stored in memory. This representation captures the part's true size and shape in real-world units. Other methods acquire 2d images only.

(2) The recognition system operates using 3D data, producing geometric shape-based (and optionally appearance-based) features that directly encode local surface structure independent of environment and imaging conditions. Other methods exclusively use appearance-based features, which are derived from 2d image projections and thus (a) have no notion of true scale; (b) have no notion of "depth" or 3d surface structure; and (c) are affected dramatically by illumination, shadows, camera settings, viewpoint, and environment.

(3) Results are presented to the user in a multitude of formats that consist of traditional images and text annotations (these are the only formats returned by other methods), but additionally present rotatably viewable 3d models stored in the database.

(4) Retrieving 3D models, and encoding their true dimensions, allow the user to further narrow the search results via interactive inspection (e.g., manipulating the candidate models in a 3D viewer) and via manual data entry (e.g., specifying part length and diameter). Other methods allow only for visual inspection of static images and textual descriptions.

(5) As with queries, models acquired for database generation are also inherently 3D. This allows alternate "virtual" or "ideal" sources such as CAD files to populate the database without needing to obtain physical parts. Furthermore, only a single (partial or complete) scan suffices to represent each part. Other methods require imaging physical parts, and often involve dozens or hundreds of examples for training.

(6) Also as with queries, the system extracts geometric shape-based (and optionally appearance-based) features when populating the database. These features are highly commensurate with those extracted for queries because they rely on exactly the same underlying geometry. With image-based methods, matching query to database information is substantially more difficult and requires much more extensive imaging of each part in order to sufficiently capture expected variations in size, viewpoint, and illumination.

Figure 3:
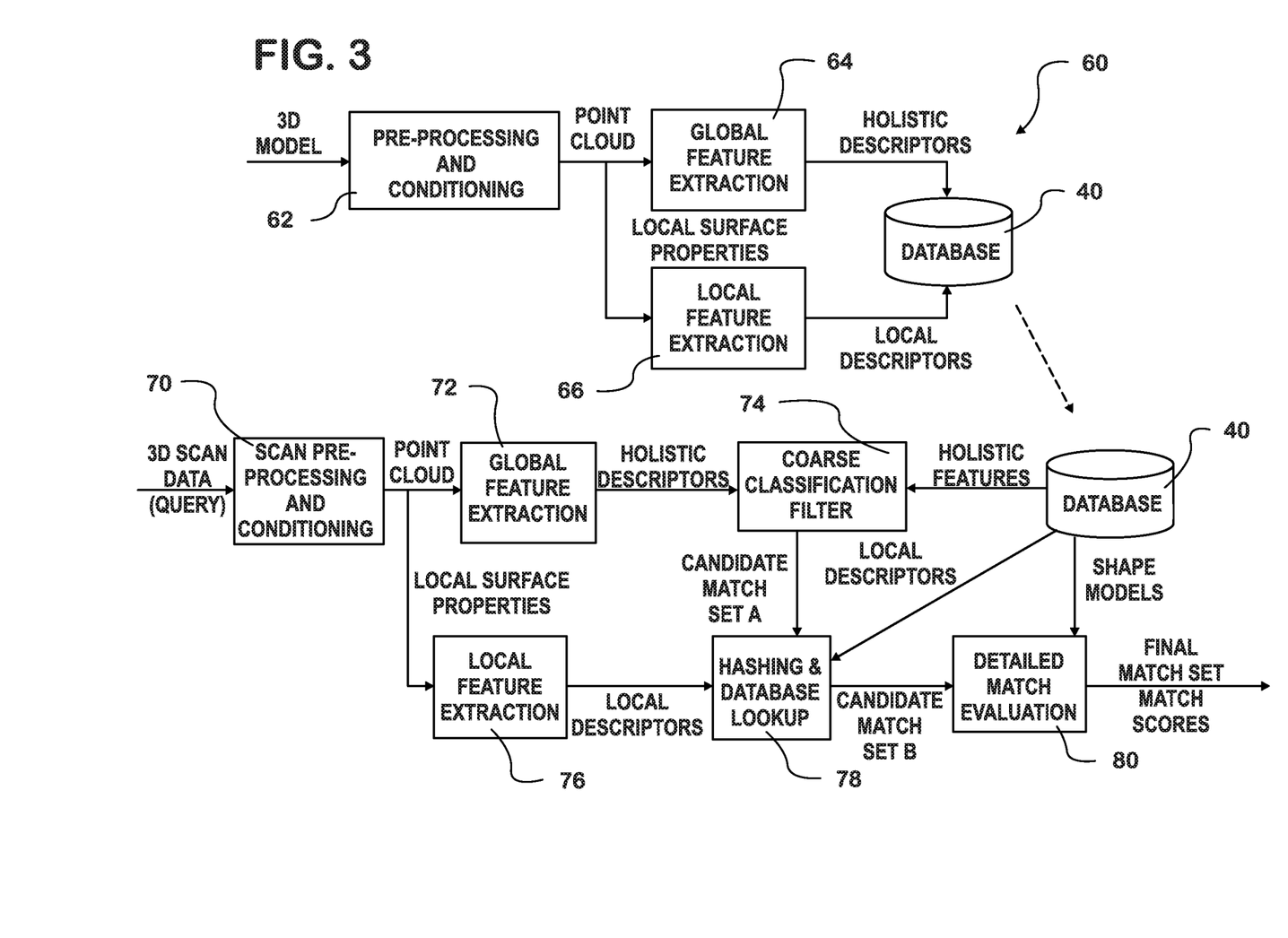
FIG. 3 presents a logic flow diagram of database creation in connection with a part matching process of the present invention.

Turning now to FIG. 3, the figure depicts the computerized process 60 for (a) database creation and its use in (b) matching in more detail. In both pipelines, the input data is pre-processed at 62 to properly scale and orient the part, and to create a low-level representation (e.g., 3d point cloud and differential orientation at each point); also in both pipelines, these low-level representations are used to extract both global features at 64 and local features at 66. Global or holistic features describe the entire part and provide compact, coarse characteristics such as overall shape and dimensions, while local features encode finer shape detail localized to small regions on the part's surface, with both being stored in database 40. All features are indexed via efficient hashing and either stored to the database 40 or used to query the database 40. Other data aggregations, such as feature clustering, classifiers, learned classifiers, neural networks, or combinations thereof, are also applied and stored to the database 40.

The recognition process begins by considering all possible database models for a particular query at 70 and then applies a sequence of progressively more complex (and more selective) filters. The first of these filters, global feature extraction 72, consider only holistic query descriptors, providing a coarse classification at 74 that can be compared very quickly to those in the database 40 so as to immediately eliminate most possible candidates, resulting in set A. Next, local descriptors 76 extracted from the query part are hashed and/or classified at 78 and used to efficiently scan the database's feature index, further reducing possible matches to set B. Finally, the system can evaluate each surviving candidate in greater detail at 80 to determine its complete surface-to-surface similarity to the query; this process produces the final list of candidates, along with similarity scores that can be used for ranking and user presentation.

Figure 4:
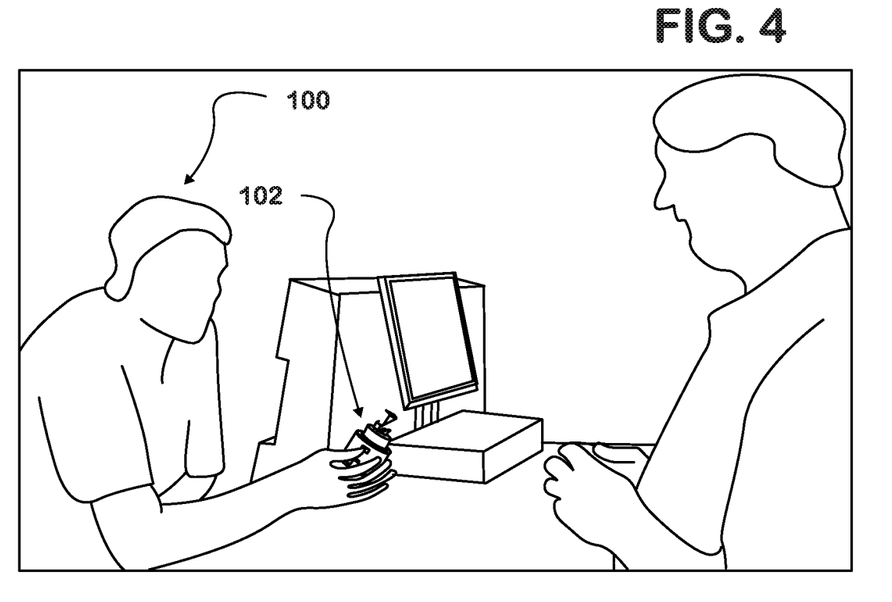
FIG. 4 shows a customer bringing in a part for identification by the system and method of the present invention, in this example a plumbing cartridge.

FIG. 4 shows a customer 100 bringing in a part 102 for identification by the system and method of the present invention, in this example a plumbing cartridge 102. Although the example throughout deals with a plumbing part this should not be construed as limiting inasmuch as the method and system may be used in any other field where repair/replacement parts are required, such as for example in the automotive part industry, etc.

Figure 5:
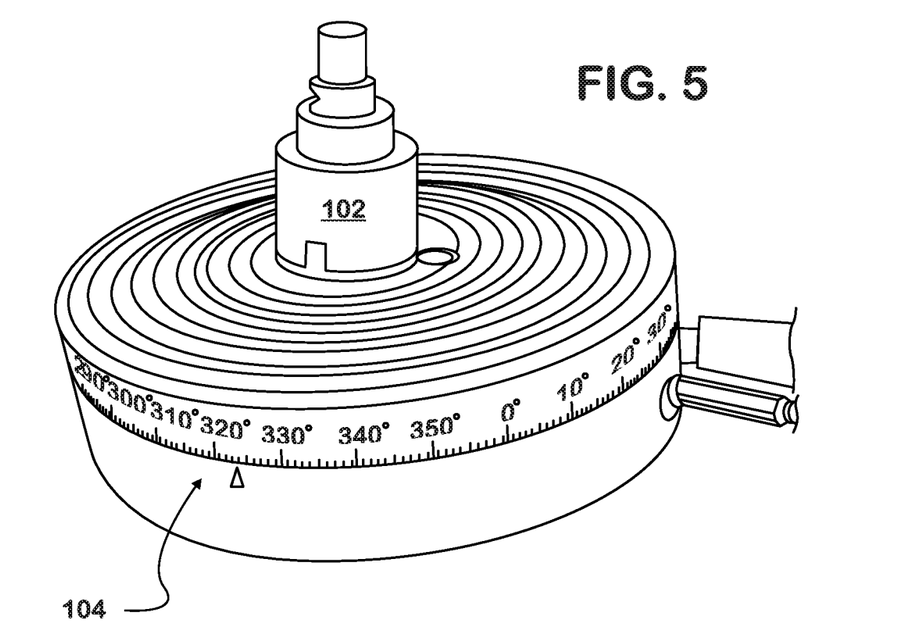
FIG. 5 shows the cartridge of FIG. 4 being placed on a turntable for scanning and identification.

FIG. 5 shows the part 102, in the form of a cartridge, of FIG. 4, being placed on a turntable 104 for 3D imaging and identification by the system and method of the present invention.

Figure 6:
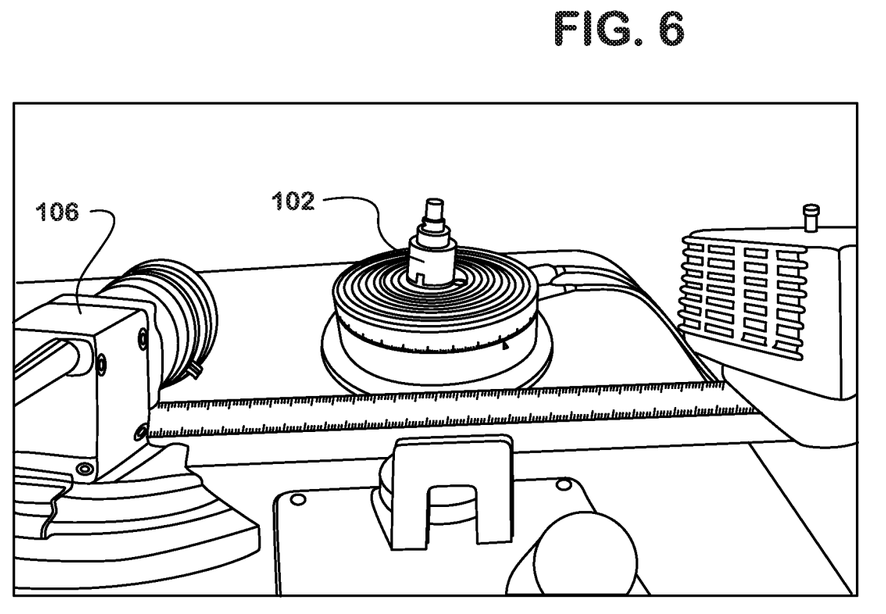
FIG. 6 shows the cartridge being scanned by a countertop 3D scanner, as an example, creating a 3D point cloud model.

FIG. 6 shows the part 102, in the form of a cartridge, being scanned by a countertop 3D scanner 106, as an example, creating a 3D point cloud model of same. Although a countertop scanner is exemplified this should not be construed as limiting inasmuch as any electronic device capable of capturing a 3D image could be used, even a future cellular phone with 3D imaging capability.

Figure 7:
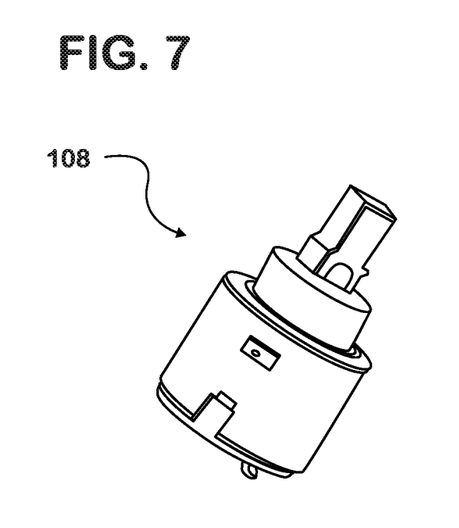
FIG. 7 shows the 3D point cloud model created by the scan of the part and the model is compared to all the cartridge models and their parameters stored in the system database.

FIG. 7 shows the 3D point cloud model 108 created by the scan of the part and the model and its parameters are compared to all the cartridge models and their parameters stored in the database 40 created for the system and stored at 50 in the memory thereof. Again, this should not be construed as limiting to the versatility of the system and method.

Figure 8:
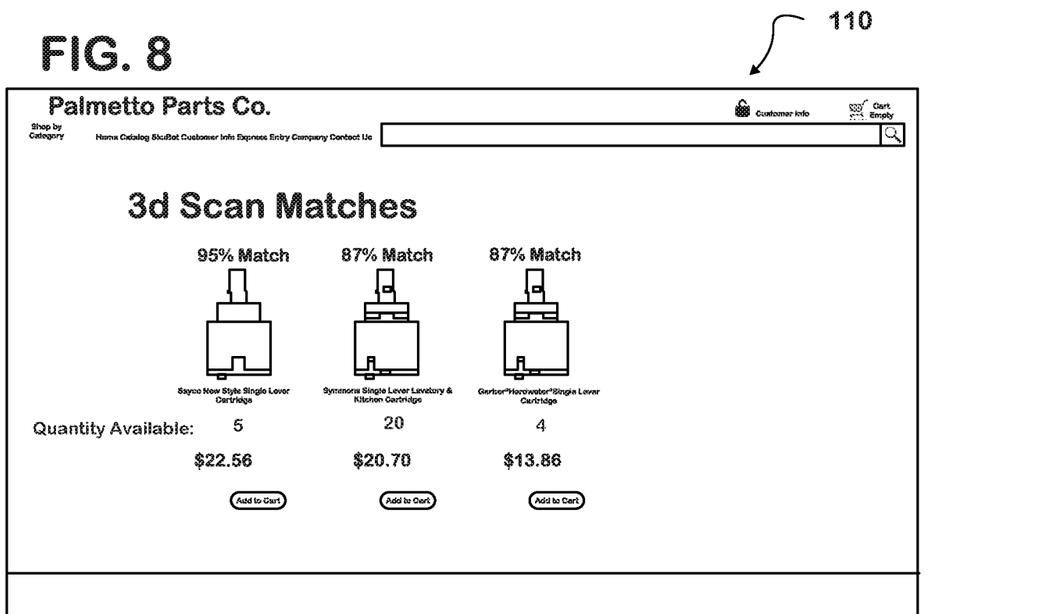
FIG. 8 shows a screenshot of potential matching parts retrieved from the system, in order of match percentage.

FIG. 8 shows a screenshot 110 of potential matching parts and information about the matching parts, such as price, part number, inventory quantity available, name of the part, size of the part, dimensions of the part, or any other information that the database 40 comprises about the matching part, retrieved from a search through the database 40 in the system memory, preferably, in the preferred embodiment, ranking down from the highest match percentage.

Figure 9:
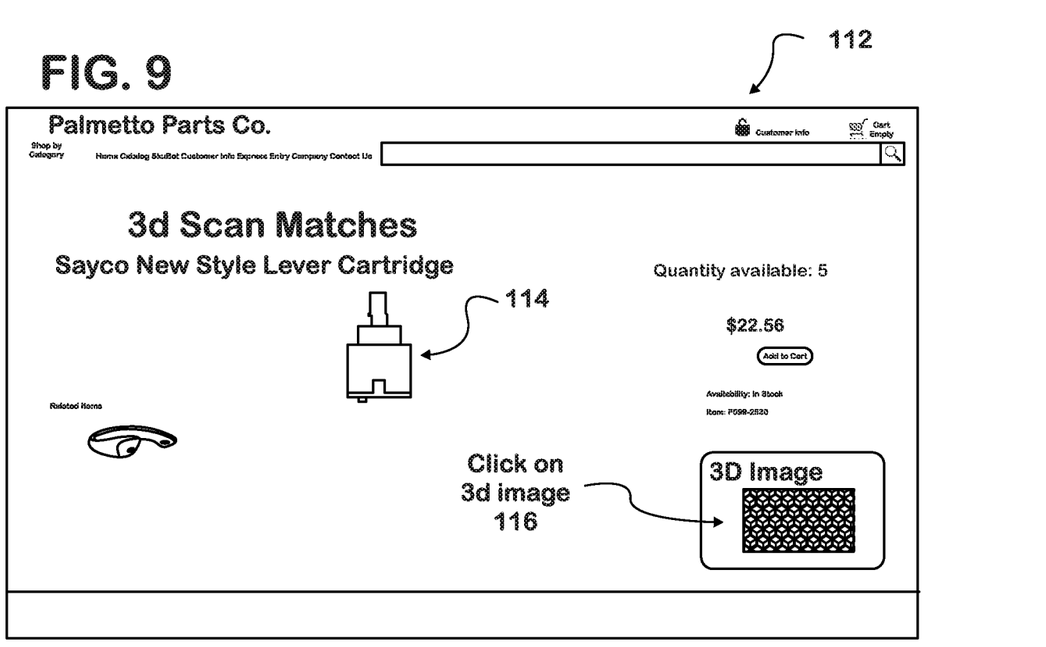
FIG. 9 shows a screenshot of the highest ranking part selected and shows a button for visualization in all dimensions, if desired.

FIG. 9 shows a screenshot 112 of the highest ranking part 114 selected and shows a link button 116 for use in presenting rotatable visualization in all dimensions, if desired.

Figure 10:
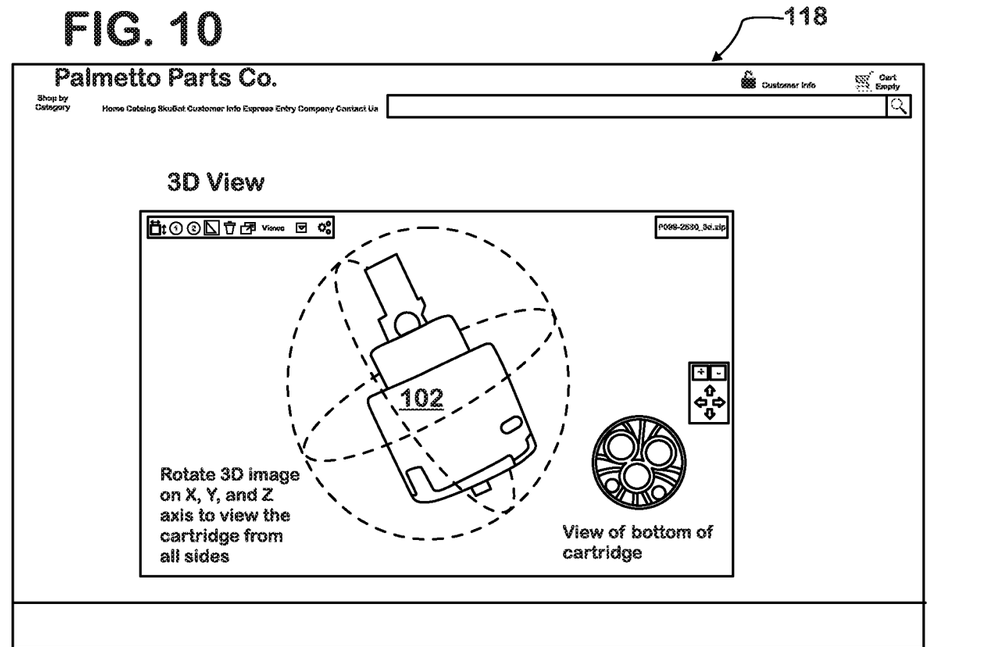
FIG. 10 shows what appears when the button of FIG. 9 is activated.

FIG. 10 shows what appears in the next screenshot 118 when the link button 116 of FIG. 9 is activated to provide rotatability to the view of the part 102.

Figure 11:
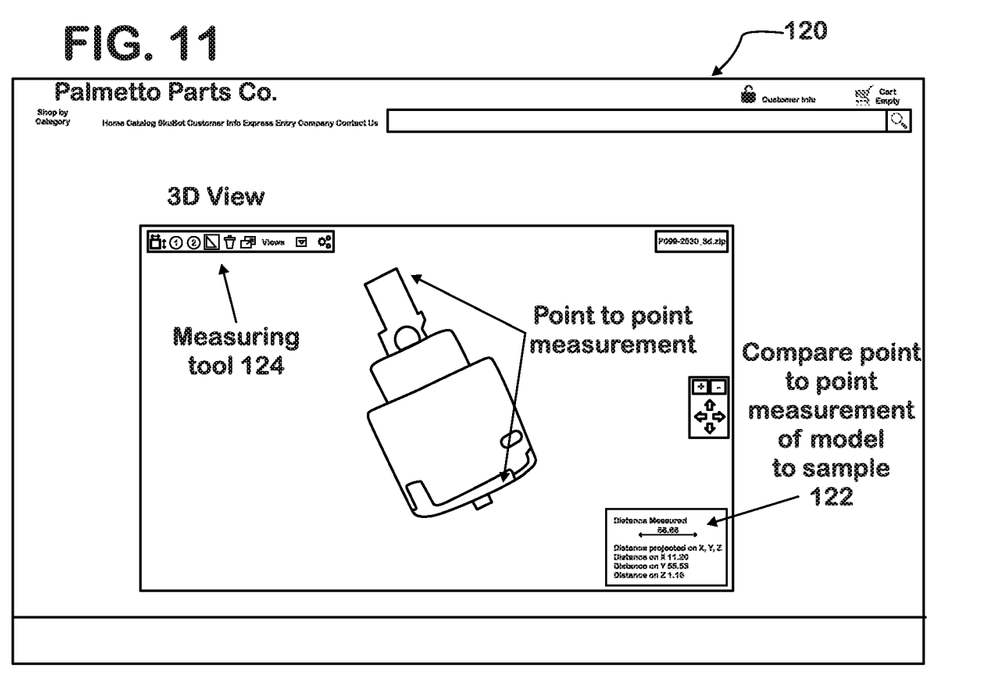
FIG. 11 shows activation of a measuring tool of the system which brings up point to point measurements for comparison with the actual part.

FIG. 11 shows a screenshot 120 including point to point measurement table 122 which may be elicited from the system and method upon activation of a measuring tool 124 of the system which brings up a point to point measurement table 122 of measurements along each axis for comparison with the dimensions of the part 102.

Figure 12:
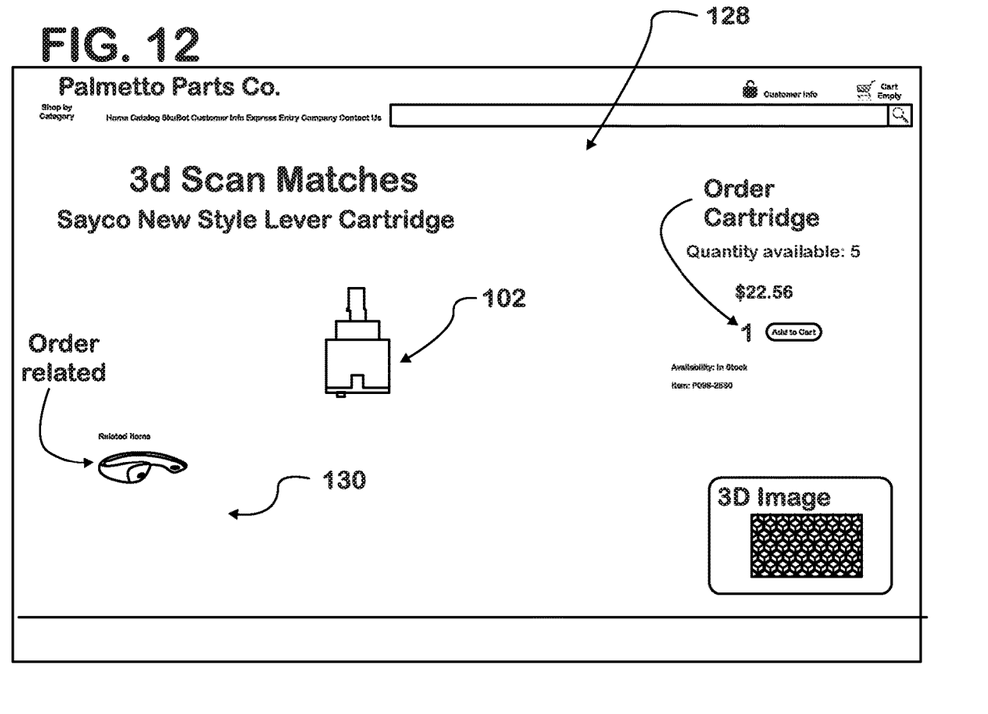
FIG. 12 shows a screenshot of an order page for the correct part, which also provides a list of related parts which may also potentially be needed.

FIG. 12 shows a screenshot 128 of an order page comprising the part information, inventory quantity available, and price for the selected, highest ranking part 102, which order page may also provide a list of related parts 130 which may also potentially be needed.

As described above, the system and method of the present invention provide a number of advantages, some of which have been described above and others of which are inherent in the invention.

Also, modifications may be proposed without departing from the teachings herein. For example, although the description deals with repair and/or replacement parts, the system and method may be used in identification of new parts as well. Accordingly, the scope of the invention is only to be limited as necessitated by the accompanying claims.

We claim:

1. A system for use in identifying a particular object or information about the object, by using 3D image data, the system comprising:

a computerized recognition system comprising a computer, a non-contact 3D imaging device, wherein the non-contact 3D imaging device comprises at least one of a structured light scanner, time-of-flight 3D scanner, depth camera, a stereo camera, or a 2D camera combined with the non-contact 3D imaging device and produces 3D point clouds, depth map, or geometric 3D surfaces;

means for the non-contact 3D imaging device to create at least one 3D model scan of the particular object, and a means for aggregating data collected from the 3D model scan, the data comprising geometric descriptors and parameters, of the particular object to create a profile of the particular object in a database, wherein the profile comprises a model of the particular object, associated identifying information, geometric descriptors, and parameters for a 3D model of the particular object;

means for the non-contact 3D imaging device to communicate with the computer and the database; and means for the computer to search the profiles of the 3D imaging scans of models of the particular objects, the computer being programmed to compare the profiles to a 3D imaging scan and associated 3D imaging scan, along with geometric descriptors and parameters, of an object that is not readily identifiable to be identified from information stored in a database within the computerized recognition system and filter the profiles, wherein the filter comprises at least one of a global feature extraction, considering holistic query descriptors and providing a coarse classification that is compared to the profiles in the database to reduce a number of candidate database part matches, or a filter wherein local descriptors extracted from a query are hashed and used to scan a database's feature index and produce a final list of candidate database part matches, along with similarity scores used for ranking and presentation to identify an object that is not readily identifiable.

2. The system of claim 1, wherein the computer being programmed to interactively filter the profiles available in the database by inputting parameters for physical attributes of the particular object not readily identifiable, wherein the physical attributes comprise textual descriptions or geometric descriptors.

3. The system of claim 1, wherein the associated identifying information comprises part measurements, prices, dimensions, or local or global geometric surface shape descriptors, which are stored as digital profiles.

4. The system of claim 1, wherein the database can be populated by scanning physical parts, or by obtaining and inputting 3D computer-aided design drawings.

5. The system of claim 1, wherein the particular object is a moveable good.

6. The system of claim 5, wherein the moveable good is hardware, jewelry, fashion, plumbing, grocery, automotive part, repair, or replacement good.

7. The system of claim 1, wherein the data collected from the 3D model is aggregated by clustering features, learning classifiers, building at least one neural network, or combinations thereof.

8. The system of claim 7, wherein the computer is programmed to use the query data to concatenate, augment, or update the database.

9. The system of claim 8, wherein the computer is programmed to search the concatenated data and the information stored in the database, and filter the database part matches for the concatenated data and the information stored in the database.

10. A method for identifying a particular object or information about the object, by using 3D image data and a computerized system comprising:
scanning, at least a portion of a particular object, using a non-contact 3D imaging device;
creating a profile of information in a database about the particular object, wherein the non-contact 3D imaging device comprising at least one of a structured light, time-of-flight 3D scanner, depth camera, or a 2D camera combined with the non-contact 3D imaging device and produces 3D point clouds, depth map, or geometric 3D surfaces;
using a computer to access the database comprising the profiles of information about the particular object, wherein
the profiles comprise 3D imaging scans, identifying information, geometric descriptors, and parameters of the particular object;
accessing a computerized recognition system using the computer that stores and allows access to the database and being programmed to assess profiles stored in the database via a series of one or more holistic, hierarchical, and/or feature-based filters that operate on extracted profiles, filters comprising a global feature extraction,
searching the database, considering only holistic query descriptors and providing a coarse classification that is compared to the profiles in the database to reduce a number of candidate database part matches;
filtering the database part matches, wherein the local descriptors extracted from a query are hashed and used to scan a database's feature index, further reducing possible candidate database part matches and a third filter wherein surface-to-surface similarity is compared to that of the query producing a final list of candidate database part matches, along with similarity scores used for ranking and presentation; and
sending the profile of information collected from the non-contact 3D imaging device to the computer via a communication network between the non-contact 3D imaging device and the computer, wherein the computer is programmed to receive the information from the non-contact 3D imaging device.

11. The method of claim 10, further comprising using the filters to interactively filter the profiles in the database by inputting parameters for physical attributes of a particular object not readily identifiable, wherein the physical attributes comprise textual descriptions or geometric descriptors.

12. The method of claim 11, further comprising executing a query to determine a price of the particular object not readily identifiable.

13. The method of claim 11, further comprising executing a query to determine an inventory quantity available for the particular object not readily identifiable.

14. The method of claim 10, wherein the non-contact 3D imaging device comprises sensors or scanners that are transportable to scan objects and produce measurements in real-world scale units, and extracting associated identifying information, geometric descriptors, and parameters for a 3D model of the particular object and create a profile of the object to be stored in the database.

15. The method of claim 14, wherein the extracted associated identifying information, geometric descriptors, and parameters for a 3D model of particular object that is scanned by a transportable sensor or scanner is transmitted to the computer and stored in the database.

16. The method of claim 15, wherein the database profiles along with images, text descriptions, pricing, and other associated identifying information are retrievable.

17. The method of claim 10, wherein the database profiles are sent to a 3rd party inventory management website or software service.

18. The method of claim 10, further comprising executing a query to identify a particular object not readily identifiable and determine a price of the particular object not readily identifiable.

19. The method of claim 10, further comprising executing a query to identify particular object not readily identifiable and determine inventory quantity available for the particular object not readily identifiable.

20. The method of claim 19, further comprising building at least one feature index and/or learning at least one classifier, wherein the at least one feature index and/or classifier is built from partitions of a feature space or weights in a neural network.

* * * * *